United States Patent
Fechner et al.

(10) Patent No.: US 12,549,698 B2
(45) Date of Patent: Feb. 10, 2026

(54) ROBUST STEREO CAMERA IMAGE PROCESSING METHOD AND SYSTEM

(71) Applicant: Continental Autonomous Mobility Germany GmbH, Ingolstadt (DE)

(72) Inventors: Thomas Fechner, Wasserburg (DE); Stefan Heinrich, Kressbronn (DE); Dieter Krökel, Eriskirch (DE); Elias Strigel, Wangen (DE)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 65 days.

(21) Appl. No.: 18/342,268

(22) Filed: Jun. 27, 2023

(65) Prior Publication Data

US 2023/0421739 A1  Dec. 28, 2023

(30) Foreign Application Priority Data

Jun. 27, 2022   (EP) ..................................... 22181160

(51) Int. Cl.
*H04N 13/128* (2018.01)
*H04N 13/00* (2018.01)

(52) U.S. Cl.
CPC ... *H04N 13/128* (2018.05); *H04N 2013/0081* (2013.01)

(58) Field of Classification Search
CPC .................................................. H04N 13/128
See application file for complete search history.

(56) References Cited

U.S. PATENT DOCUMENTS

| 2020/0005489 A1* | 1/2020 | Kroeger | .................... G06T 7/85 |
| 2021/0065393 A1* | 3/2021 | Jeon | ........................ G06T 7/593 |

(Continued)

FOREIGN PATENT DOCUMENTS

| CN | 111464804 A | 7/2020 |
| CN | 113077401 A | 7/2021 |
| CN | 113516699 A | 10/2021 |

(Continued)

OTHER PUBLICATIONS

European Search Report dated Dec. 15, 2022 for the counterpart European Patent Application No. 22181160.7.

(Continued)

*Primary Examiner* — Shivang I Patel
(74) *Attorney, Agent, or Firm* — Buchanan Ingersoll & Rooney PC

(57) ABSTRACT

The disclosure relates to a method and system for extracting disparity information out of a pair of stereo camera images for processing images of camera sensors for Automated Driving or Advanced Driver Assistance Systems in a vehicle. The method includes: a) receiving a pair of unrectified stereo camera images, b) performing a 2D-matching of the received pair of images using a trained convolutional neural network and providing the 2D-displacement on a pixel-by-pixel level as disparity information, and c) outputting the 2D-displacement on pixel level. The method is robust which does not require a high precision rectification. Applying rectification on the disparity values after the matching process leads to reduced algorithmic complexity with simultaneous preservation of all information.

13 Claims, 4 Drawing Sheets

(56) References Cited

U.S. PATENT DOCUMENTS

2021/0326678 A1* 10/2021 Smolyanskiy .......... G01S 7/417
2023/0351769 A1* 11/2023 Wu ...................... G06V 10/762

FOREIGN PATENT DOCUMENTS

| CN | 113077401 B | 6/2022 |
|---|---|---|
| DE | 102020214622 A1 | 5/2022 |
| EP | 3176750 A1 | 6/2017 |
| EP | 3893498 A1 | 10/2021 |
| WO | 2009/134155 A1 | 11/2009 |

OTHER PUBLICATIONS

Frederik Zilly et al: "Joint Estimation of Epipolar Geometry and Rectification Parameters using Point Correspondences for Stereoscopic TV Sequences", 3DPVT 2010, Fifth International Symposium on 3D Data Processing, Visualization and Transmission. Electronic Proceedings: May 17-20, 2010, Espace Saint-Martin, Paris, France, May 17, 2010 (May 17, 2010), XP055101829.

Michael Bleyer et al: "Temporally consistent disparity maps from uncalibrated stereo videos", Image and Signal Processing and Analysis, 2009. ISPA 2009, Proceedings of 6th International Symposium On, IEEE, Piscataway, NJ, USA, Sep. 16, 2009 (Sep. 16, 2009), pp. 383-387, XP031552046, ISBN: 978-953-184-135-1.

D Krokel et al., "Camera Based Lost Cargo Detection for Automated Driving", Proceedings Sia Vision 2018, Oct. 9-10, 2018.

Sandeep Katragadda, "Identification of stereo rig alignment error based on vertical disparity map," Journal of WSCG, vol. 27, No. 2, 2019 (http://www.wscg.eu).

Office Action (Communication pursuant to Article 94(3) EPC) issued Sep. 24, 2025, by the European Patent Office in corresponding European Patent Application No. 22 181 160.7-1218. (7 pages).

Office Action (The First Office Action) issued Oct. 31, 2025, by the State Intellectual Property Office of People's Republic of China in corresponding Chinese Patent Application No. 202310688101.1 and an English translation of the Office Action. (12 pages).

* cited by examiner

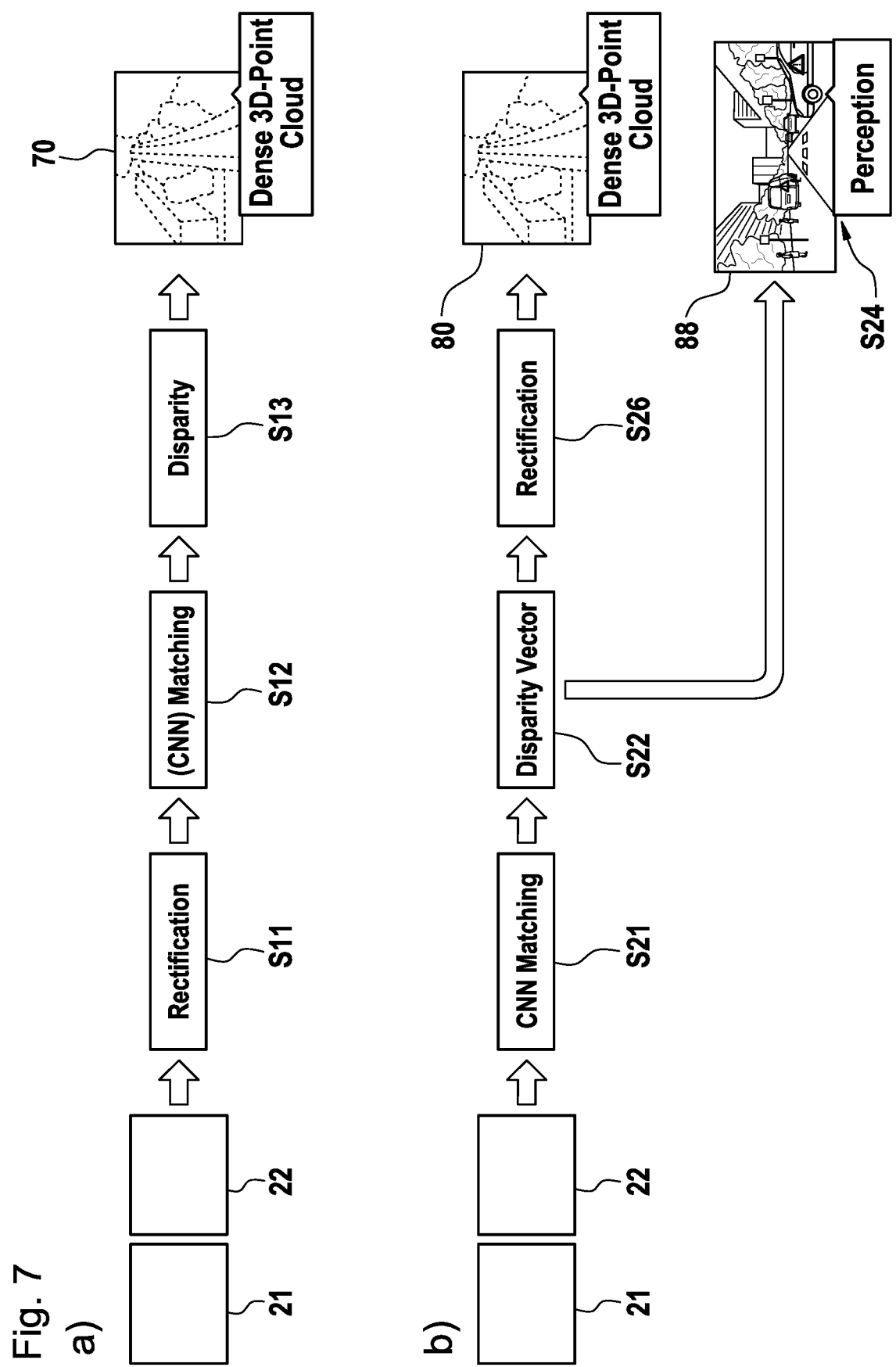

ROBUST STEREO CAMERA IMAGE PROCESSING METHOD AND SYSTEM

CROSS REFERENCE TO RELATED APPLICATION

The present application claims the benefit and priority of European Patent Application No. 22181160.7, filed on Jun. 27, 2022, the content of which is incorporated by reference herein.

FIELD OF INVENTION

The invention relates to a method and system for extracting disparity information out of a pair of stereo camera images that can be used, for example, for processing images of camera sensors for Automated Driving or Advanced Driver Assistance Systems (AD or ADAS) in a vehicle.

BACKGROUND

Stereo camera systems are in use for automotive applications, e.g., in EP 3176750 A1 a stereo imaging and processing system for a motor vehicle is shown. The system is adapted to perform rectification of stereo images, stereo matching of rectified images, and to detect an object in the surrounding of the motor vehicle from stereo matched images. A data processing device is adapted to perform, for image elements of a rectified image from one imaging device, a search for a best-matching image element in the corresponding rectified image from the other imaging device, the search covering a two-dimensional search area. A search yielding vertical shift information from which a vertical shift from the image element to the best-matching image element is derived. The data processing device is adapted to calculate a pitch angle error and/or a roll angle error of or between the imaging devices from the vertical shift information.

Typical Stereo Camera systems require image rectification before the matching processing. This is typically done for practical reasons in order to reduce the complexity of the matching algorithm (e.g. SGM, semi global matching). In case that the rectification is performed on a camera horizontal line, the matching for disparity can be reduced to a 1-dimensional problem.

D. Krökel et al.: "Camera Based Lost Cargo Detection for Automated Driving", Proceedings SIA VISION 2018, shows a camera based approach which relies on two different satellite stereo camera systems to extract small obstacles on the road by direct 3D measurement. One of the satellite stereo camera modules is a telephoto camera.

DE 102020214622 A1 relates to a method and a device for evaluating image data of a stereo camera. The method for evaluating image data of the stereo camera comprises the steps:
 a) receiving image data of an original resolution that have been captured by the stereo camera,
 b) receiving or calculating image data having a reduced resolution,
 c) detecting objects from 2D image data of one camera module of the stereo camera,
 d) performing a stereo evaluation with the original resolution in a search area of the image data comprising a detected object and with the reduced resolution in the remaining areas of the image data in order to determine 3D information of the object and the surroundings, and
 e) outputting the 3D information.

For high resolution cameras with lens distortion, the rectification can be quite computationally intensive and blows up the size of resulting «Linearized» image. During the rectification step, interpolation between pixels is required. This blurs the pixel information. Further, resolution in some areas is increased without adding more information. However, in some areas resolution in decreased and information is discarded.

SUMMARY

It is an object of the present disclosure to provide a robust stereo image processing method.

An aspect is related to an automotive function required for advanced assisted or autonomous driving.

Autonomous vehicles need to detect obstacles ahead of the vehicle. Stereo cameras have the advantage that the depth and distance of the objects can be measured.

A typical stereo camera includes two cameras looking in the same direction. By matching the left and the right images the disparity is calculated which is related to the depth of the objects. An alternative stereo camera includes a mono camera that is moved, which is typically the case for a mono camera in a driving vehicle. From pairs of images (or series of images) obtained at subsequent points in time, the structure of the environment may be extracted ("structure from motion").

The proposed method may be used for 2D/3D object detection, 2D/3D object tracking, 3D scene reconstruction, 3D mapping, 3D environment model (e.g., obtained through a fusion of camera images with radar/laser sensors), lost cargo detection, object detection, 3D road surface modelling and/or augmented reality (AR)-based visualization.

A method for extracting disparity information out of a pair of stereo camera images includes:
 a) receiving a pair of unrectified stereo camera images,
 b) performing a 2D-matching of the received pair of images using a trained convolutional neural network providing the 2D-displacement on a pixel-by-pixel level as disparity information, and
 c) outputting the 2D-displacement on pixel level.

The convolutional neural network has been trained to generate a map of the 2D displacement per pixel from a pair of unrectified stereo camera images using supervised learning methods.

According to an embodiment, the 2D-displacement is described as disparity vector.

In an example, the 2D-displacement information is used as an input for subsequent perception tasks such as object detection or the like.

According to an embodiment, the directions of the 2D-displacements are accumulated over time providing a filtered angular direction for image-pixel positions. The filtered angular direction corresponds to the epipolar-line-direction at that particular image-pixel position.

In an example, fundamental-matrix parameters of the stereo camera system are computed from the unrectified pixel-by-pixel disparity.

According to an embodiment, the 2D displacement is used for a disparity correction for extrinsic camera-parameters. Intrinsic camera-parameters may be known from initial camera calibration processes.

In an example, 3D real world coordinates in meters are calculated using the 2D displacement. Intrinsic camera-parameters may be known or estimated for calculating real distances.

According to an embodiment, the 2D displacement is used for calculating a dense 3D point cloud.

A system for extracting disparity information out of a pair of stereo camera images includes an input unit, a processing unit and an output unit. The input unit is configured to receive a pair of unrectified stereo camera images.

The processing unit is configured to perform a 2D-matching of the received pair of images using a trained convolutional neural network providing the 2D-displacement on a pixel-by-pixel level as disparity information. The output unit is configured to output the 2D-displacement on pixel level.

A further aspect concerns a vehicle including a system for extracting disparity information and a stereo camera system. The stereo camera system is configured to generate pairs of unrectified stereo camera images and outputs them to the system for extracting disparity information.

The benefit of the proposed system is the robustness which does not require a high precision rectification. Applying rectification on the disparity values after the matching process leads to reduced algorithmic complexity with simultaneous preservation of all information, compared to the prior art.

In other words, the proposed solution uses a stereo camera system which provides the images (intensity, RGB, raw Bayer (undemosaiced), . . . ) and a disparity map which describes the displacement between two corresponding pixels in the left and right image. The proposed system does not require rectification before the disparity computation. Disparity computation typically includes a pixel by pixel matching of the left and right image. The proposed matching process is capable of computing 2D displacements. The resulting displacements are described on pixel by pixel as a 2D vector (displacement in x and y dimensions). A trainable neural network is applied for the matching process which is trained using shifted and rotated images. Other 2D matching algorithms can also be used (e.g. block matching). In order to extract true depth information, the intrinsic camera parameters have to be considered. This leads to rectification of the disparity map after the matching. So, the 2D image disparity is utilized to calculate the 3D point measurements in world/vehicle coordinates.

Accumulating Corrected Disparity-Measurements Over Time

After the disparity-matching has been applied to the raw (distorted, unrectified) images, the direction of the 2D disparity-vectors will be accumulated over time, resulting in a filtered angular direction, equivalent to the epipolar-line-direction at that particular image-pixel position.

BRIEF DESCRIPTION OF THE DRAWINGS

Further embodiments and aspects of the present disclosure may be understood from the following description and figures.

FIG. 7 shows a comparison between a stereo image processing method known from the prior art (a) and an embodiment of the present processing method (b).

DETAILED DESCRIPTION

Figure 1:
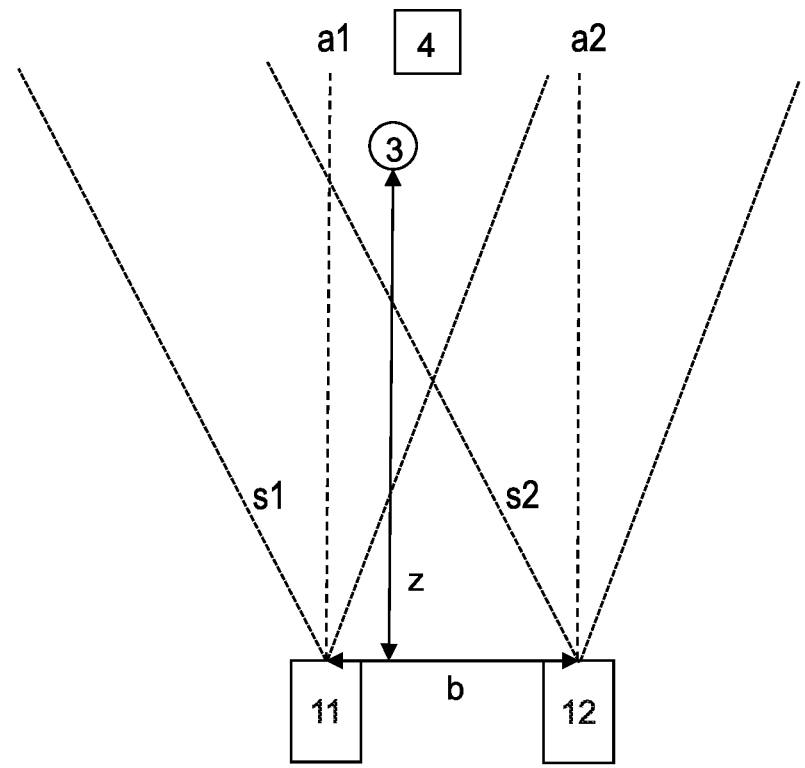
FIG. 1 shows schematically a stereo camera capturing objects.

FIG. 1 schematically shows the detection of objects 3, 4 by the two camera modules 11, 12 of a stereo camera in a viewing perspective from above. The left stereo camera module 11 is located one base width b away from the right stereo camera module 12. The optical axis of the left stereo camera module 11 is schematically represented by the straight line a1, the optical axis of the right stereo camera module 12 by the straight line a2. The detection or viewing range of the left stereo camera module 11 is symbolized by the dotted straight lines 51, that of the right stereo camera module 12 by the dotted straight lines s2. The distance of the circular object 3 to the stereo camera 11, 12 (perpendicular to the line indicating the base width b) is z.

Figure 2:
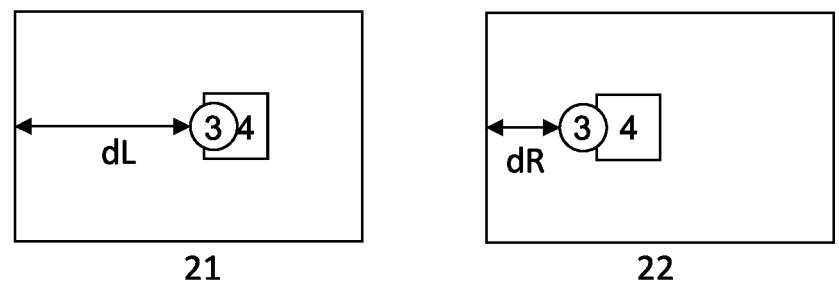
FIG. 2 shows two images captured simultaneously by the stereo camera.

FIG. 2 schematically shows the two images captured by the stereo camera modules 11, 12 in the described situation (cf. FIG. 1). The two objects 3, 4 are differently positioned in both images 21, 22 due to the different position of the two camera modules in the horizontal direction. In the image 21 of the left stereo camera module 11 shown on the left, both objects 3, 4 appear further to the right. The horizontal image distance of the circular object 3 in the left image 21 measured from the left image edge is dL. In the right image 22 of the right stereo camera module, both objects 3, 4 appear further to the left than in the left image 21. The horizontal image distance of the circular object 3 in the right image 22 measured from the left image edge is dR. The displacement of the circular object 3 between left and right image 21, 22 is the disparity d, which can be calculated as:

$$d=|dL-dR|.$$

From FIGS. 1 and 2, it can be seen that the disparity d depends on the distance z and the base width b.

As shown in D. Krökel et al., in section 5.1 (further considerations: section 5.3.1), the distance z of an object 3 to be determined to the stereo camera 11, 12 depends on the focal length of the optics f and the base width b of the stereo camera 11, 12 as well as the disparity d.

The minimum distance range that can be determined by a stereo system is determined by the maximum disparity range. The disparity d is inversely proportional to the distance z:

$$z=f*b/d.$$

Figure 3:
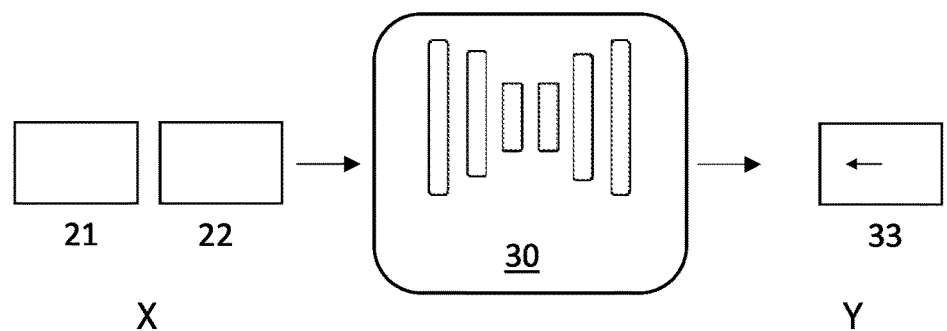
FIG. 3 shows a general overview of a machine learning embodiment for extracting 2D displacement information from stereo camera images.

FIG. 3 schematically shows a general overview of a machine learning embodiment for extracting 2D displacement information from stereo camera images. A component is a machine learning system 30, e.g., a convolutional neural network (CNN), which learns, during a training phase, to generate a disparity vector map 33 from a pair of stereo camera images 21, 22. The disparity vector map or disparity vector image 33 shows the disparity vector on a pixel-by-pixel level.

To train the machine learning system 30, which is, for example, a decision tree learning system, a support vector machine, a regression analysis-based learning system, a Bayesian network, a neural network, or a convolutional neural network, training input data X (a plurality of image pairs 21, 22) and associated training target maps Y (a plurality of corresponding disparity vector maps 33) are provided. Using the machine learning system 30, output maps Y' (not shown) are generated from the training input data X. The goal of the training is to ensure that the output maps Y' are as similar as possible to the training target maps Y without overfitting. For this purpose, the remaining deviations between the output maps Y' and the training target maps Y are determined from the generated output maps Y' and the training target maps Y, for example, using a similarity metric. These discrepancies are used, for example, via backpropagation to adjust parameters of the machine learning system 30. This is repeated until a predetermined match has been obtained or until signs of overfitting occur.

By means of the machine learning system 30 trained in this way, output maps Y' are then generated from newly fed input data X.

Figure 4:
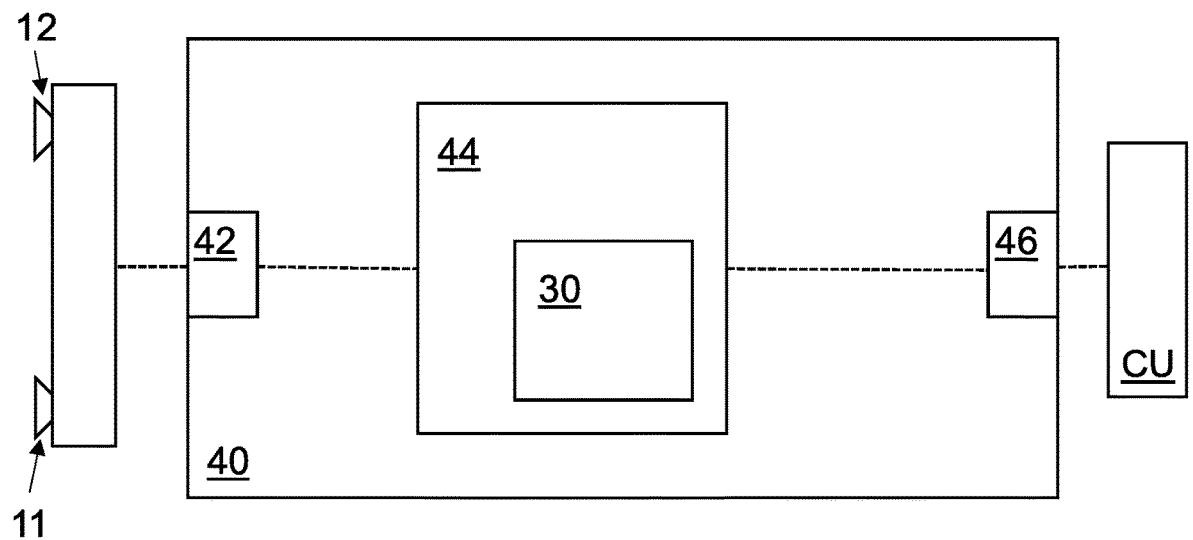
FIG. 4 shows schematically a system for extracting 2D displacement information from a stereo camera.

FIG. 4 schematically shows a system 40 for extracting 2D displacement information from a stereo camera 11, 12 with an input interface 42, a data processing unit 44 with a machine learning system 30, and an output interface 46 for outputting fused data to a further unit CU. Two cameras 11, 12, e.g. two satellite cameras with identical optical properties, can be mounted on a vehicle.

Based on the image data from the cameras 11, 12, a plurality of ADAS or AD functions can be provided by an ADAS/AD control unit as an example to the further unit CU, e.g., a lane detection, lane keeping assistance, traffic sign detection, speed limit assistance, road user detection, collision warning, emergency braking assistance, distance following control, construction site assistance, a highway pilot, a cruising chauffeur function, and/or an autopilot.

The machine learning system 30 may include an artificial neural network, such as a convolutional neural network (CNN).

Figure 5:
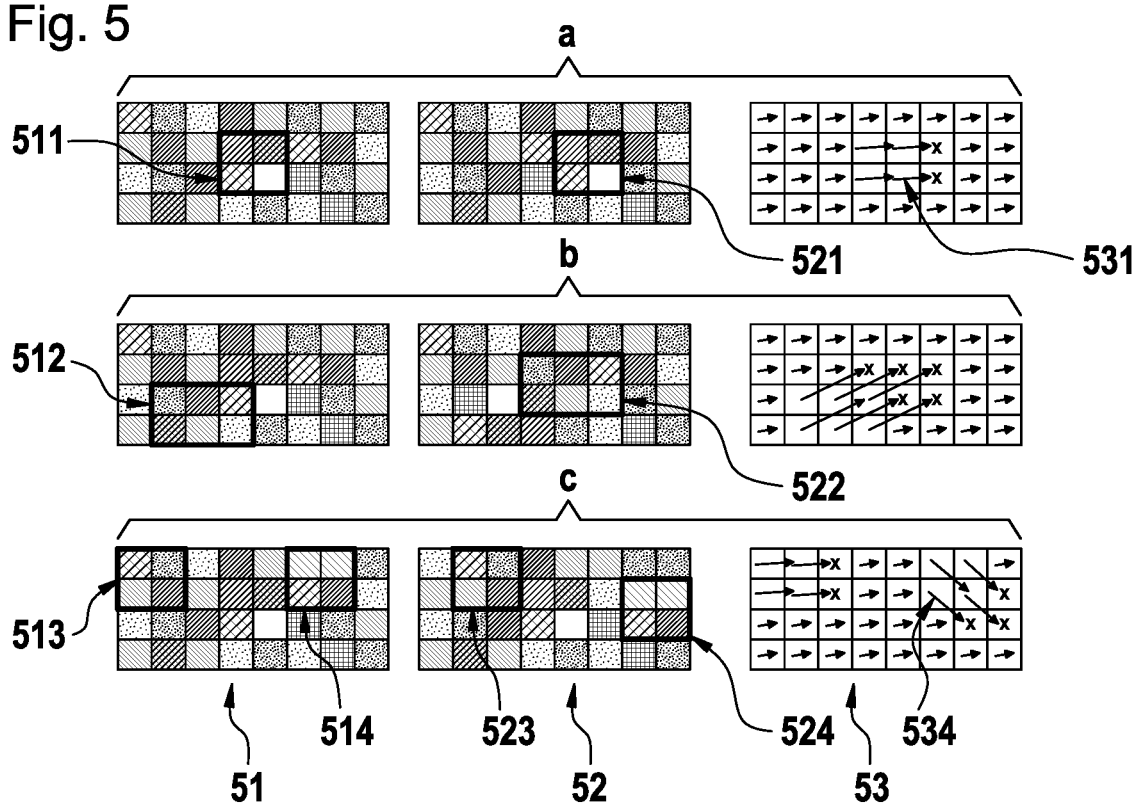
FIG. 5 shows, in the two columns on the left, corresponding pairs of pixel regions obtained from the left and right camera at the same time, and in the right column a schematic representation of the 2D-displacement for each pixel.

FIG. 5 shows, in the two columns 51, 52, three pairs of pixel regions 51*a*, 52*a*; 51*b*, 52*b*; and 51*c*, 52*c*, obtained from the left and right camera 11, 12 at the same time for each row a, b, c. The machine learning system 30 has been trained to match 2×2 pixel blocks (511+521 upper row and 513+523, 514+524 lower row) or 3×2 pixel blocks 512+522 in respective pairs of left and right camera pixel regions (51*a*+52*a*; 51*c*+52*c*; 51*b*+52*b*). A vertical shift component is possible as the camera images are not rectified. The right column 53 shows a schematic representation of the 2D-displacement (between the corresponding pixel regions 51*a*, 52*a*→disparity vector grid/map 53*a*, etc.) for each pixel. The disparity vector 531 corresponds to the displacement of the lower right pixel of the matching 2×2 blocks 511+521 in the first row 51*a*, 52*a*. Similarly, the disparity vector 534 corresponds to the lower left pixel of the right 2×2 block 514+524 in the third row 51*c*, 52*c*. The representation 53*a*; 53*b*; 53*c* consists of disparity vectors for each pixel. The ensemble of disparity vectors in one row corresponds to a 2D disparity field with one disparity-vector showing the association between every single left- and right image-pixel (shown as small vectors), and a "don't care" output (shown as small crosses) for any single pixel-position which does not have a distinct pixel-by-pixel correspondence since it was not visible in both (left/right) camera-images at the same time.

Figure 6:
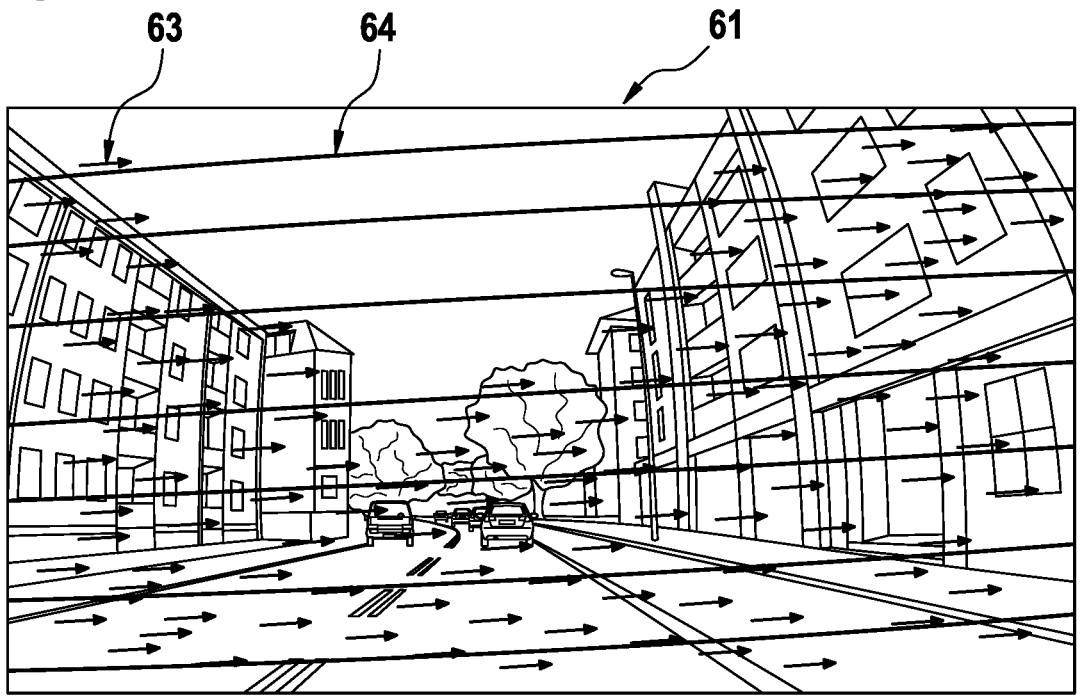
FIG. 6 shows an example of an unrectified camera image showing an urban road scene with overlaid 2D disparity vectors for multiple pixels.

FIG. 6 shows an example of an unrectified image 61 from, e.g., the left camera 11 showing an urban road scene with overlaid 2D disparity vectors 63 for multiple pixels. A distortion of the non-central regions of the unrectified image is clearly visible as, e.g., the buildings on the left and on the right side of the road are imaged with curved vertical lines. The direction of the 2D disparity vectors 63 can be accumulated over time for a series of stereo images, the result is represented through the (slightly) curved (almost horizontal) lines 64 that are also overlaid to the image 61. This representation of a filtered angular direction is equivalent to the epipolar-line-direction at that particular image-pixel position.

FIG. 7 shows a comparison between a stereo image processing method known from the prior art (a) and an embodiment of the present processing method (b).

The known method (a) requires a rectification S11 of the raw images 21, 22 obtained from the stereo camera as a first step. In a second step, stereo matching S12 is performed on the basis of the rectified images. The stereo matching S12 may be performed conventionally by, e.g., semi global matching or through a trained artificial neural network, e.g., CNN which has been trained to output disparity information when two rectified images are fed into the neural network. From the matching in a subsequent step, the disparity information S13 is calculated. From or through the disparity information a dense 3D point cloud 70 can be generated in a next step.

The embodiment of the novel processing method (b) starts with feeding unrectified stereo images 21, 22 to the machine learning system, e.g., CNN, which has been trained to match in two dimensions small pixel blocks (e.g. 1×1, 2×2, 3×2, 3×3, ... ) between left and right unrectified images. The first step can be called CNN Matching S21. Naturally, the CNN uses a "minimal" pixel neighborhood for the correspondence search (e.g. 2×2 blocks). It is, however, possible that single pixels without a direct neighborhood (1×1 blocks) obtain a correspondence value. As a result of the matching step, disparity vectors are extracted in the subsequent step S22 for a large number of pixels or for all pixels. In other words, the images are fed to a processor which computes the 2D disparity field of the two cameras.

In one embodiment, it is possible to perform perception functions in a subsequent step S24 based on the obtained 2D-disparity field. For this purpose, a further machine learning system has been trained to output perception data 88 when presented 2D disparity vector maps as input. An example of perception data 88 is an image segmentation where, e.g., the road, road markings, buildings and objects in an image are identified.

In a second embodiment, the disparity vectors (or 2D-disparity field) may be used as a basis for Rectification S26 of the raw images 21, 22. The 2D disparity field is rectified using the intrinsic camera parameters in order to compute true depth information (3D point cloud). This means that it is possible to generate a dense 3D point cloud 80 in a next step.

Computing Fundamental-Matrix Parameters of the Stereo-System from Unrectified, Pixel-by-Pixel Disparity Without prior knowledge of real world distances, one can use the fundamental-matrix of the stereo-system to compute the vertical-disparity $v_r - v_l$ for any pixel-position in the image using the following linear approximation:

$$v_r - v_l = \underbrace{\hat{t}_y(u_r - u_l)}_{Y-shift} + \underbrace{\frac{\hat{t}_z}{\hat{f}_l}(u_l v_r - u_r v_l)}_{Z-shift} + \underbrace{\alpha_f v_r}_{zoom\ difference}$$

$$\underbrace{-\alpha_x \hat{f}_l}_{tilt} - \underbrace{\frac{\alpha_x}{\hat{f}_l} v_l v_r}_{} + \underbrace{\frac{\alpha_y}{\hat{f}_l} u_r v_l}_{pan} + \underbrace{\alpha_a u_r}_{roll}.$$

where
ty=ty/tx, tz=tz/tx define the relative translation of right camera with respect to the left camera along Y and Z axes, ur−ul=du is the horizontal disparity representing the depth, vr−vl=dv is the vertical disparity,(ul, vl)=pl is the projection of a point P in space on the image plane of left camera, while (ur, vr)=pr is the projection of the same point on the image plane of the right camera, f corresponds to the focal length fl of the left camera (in pixels), of is the focal lengths difference between the cameras: fr=(1−af)fl, ax, ay, az are the relative rotation angles of the right camera with respect to the left camera around X, Y and Z axes. The background of this equation can be understood from S. Kathragadda "Identification of stereo rig alignment error based on vertical disparity map," Journal of WSCG, Vol. 27, No. 2, 2019, p. 151-160, ISSN 1213-6972.

The equation for vr−vl given above turns out to be . . .

$$vr-vl=ty^*(ur-ul)+tz/f^*(ul^*vr-ur^*vl)+af^*(vr)+ax^*f^*(-1)+ax/f^*(-vl^*vr)+ay/f^*(ur^*vl)+az^*(ur)$$

$$dv=ty^*(-du)+tz/f^*(du^*vl-ul^*dv)+af^*(vl-dv)+ax^*f^*(-1)+ax/f^*(vl^*dv-vl^2)+ay/f^*(ul^*vl-du^*vl)+az^*(ul-du)$$

$$dv=ty^*(-du)+tz/f^*(du^*v-u^*dv)+af^*(v-dv)+ax^*f^*(-1)+ax/f^*(v^*dv-v^2)+ay/f^*(u^*v-du^*v)+az^*(u-du)$$

From this, a least-squares approximation of tx, ty, tz, alpha_x, alpha_y, alpha_z, and alpha_f can be applied to gain information about the rotational-, translational-, and focal-parameters between the left- and right camera.

For a small 3×3 Pixel-Area, with pixel-positions (u0,v0), (u1,v1), . . . (u8,v8), and disparities (du0,dv0), (du1,dv1), (du8,dv8) we get . . .

$$dv0=ty^*(-du0)+tz/f^*(du0^*v0-u0^*dv0)+af^*(v0-dv0)+ax^*f^*(-1)+ax/f^*(v0^*dv0-v0^2)+ay/f^*(u0^*v0-d0^*v0)+az^*(u0-du0)$$

$$dv1=ty^*(-du1)+tz/f^*(du1^*v10-u^*dv1)+af^*(v1-dv1)+ax^*f^*(-1)+ax/f^*(v1^*dv1-v1^2)+ay/f^*(u1^*v1-du1^*v1)+az^*(u1-du1)$$

$$dv2=ty^*(-du2)+tz/f^*(du2^*v02-u^*dv2)+af^*(v2-dv2)+ax^*f^*(-1)+ax/f^*(v2^*dv2-v2^2)+ay/f^*(u2^*v2-du2^*v2)+az^*(u2-du2)$$

$$dv3=ty^*(-du3)+tz/f^*(du3^*v03-u^*dv3)+af^*(v3-dv3)+ax^*f^*(-1)+ax/f^*(v3^*dv3-v3^2)+ay/f^*(u3^*v3-d3^*v3)+az^*(u3-du3)$$

$$dv4=ty^*(-du4)+tz/f^*(du4^*v04-u^*dv4)+af^*(v4-dv4)+ax^*f^*(-1)+ax/f^*(v4^*dv4-v4^2)+ay/f^*(u4^*v4-du4^*v4)+az^*(u4-du4)$$

$$dv5=ty^*(-du5)+tz/f^*(du5^*v0-5u^*dv5)+af^*Pv5-dv5)+ax^*f^*(-1)+ax/f^*(v5^*dv5-v5^2)+ay/f^*(u5^*v5-d5^*v5)+az^*(u5-du5)$$

$$dv6=ty^*(-du6)+tz/f^*(du6^*v0-u6^*dv6)+af^*(v6-dv6)+ax^*f^*(-1)+ax/f^*(v6^*dv6-v6^2)+ay/f^*(u6^*v6-du6^*v6)+az^*(u6-du6)$$

$$dv7=ty^*(-du7)+tz/f^*(du7^*v0-u7^*dv7)+af^*(v7-dv7)+ax^*f^*(-1)+ax/f^*(v7^*dv7-v7^2)+ay/f^*(u7^*v7-du7^*v7)+az^*(u7-du7)$$

$$dv8=ty^*(-du8)+tz/f^*(du8^*v0-u8^*dv8)+af^*(v8-dv8)+ax^*f^*(-1)+ax/f^*(v8^*dv8-v8^2)+ay/f^*(u8^*v8-du8^*v8)+az^*(u8-du8)$$

$$G=A^*P$$

Vector P=(ty, tz/f, af, ax*f, ax/f, ay/f, az) is representing the unknown camera-parameters (rotation, translation, focal, . . . ) between left- and right stereo camera.

Using Disparity-Correction for External Camera-Parameters Only

With the above method, all parameters of the fundamental-matrix system can be estimated. To make estimation of external (extrinsic) mounting parameters more robust, one can use prior knowledge (calibration) of internal (intrinsic) parameters of the cameras being used.

For example, if camera-focal f is prior known, one can avoid estimating this value thru the above method, but using camera-focal as a "constant" input. Since rotational parameters ax, ay, az frequently change during operation of the stereo-system due to thermal-expansion and vibration, the above method can be used to estimate "only" these parameters, and leave others "constant."

Computing 3d Real World Coordinates in Meters

With prior knowledge of the intrinsic calibration of the stereo-system (camera-focal, lens-distortion, translation between left/right cam, . . . ), it is possible to compute real-world-distance in [m] within the 3D-environment.

The advantage is that rectification before the matching is not needed. This saves memory and computation time and preserves image information. Rectification can be computed from the 2D CNN-Matching data during operation. There is no end-of-line calibration (before first operation) necessary to run the rectification-step on the input-image like in a classic-stereo.

The invention claimed is:

1. A method for extracting disparity information out of a pair of stereo camera images, the method comprising:
   receiving a pair of unrectified stereo camera images,
   performing a 2D-matching of the received pair of unrectified images using a trained convolutional neural network providing a 2D-displacement on a pixel-by-pixel level as disparity information, and
   outputting the 2D-displacement on pixel level,
   wherein the 2D-matching and the 2D-displacement are provided absent pixel depth information of the stereo camera images, and
   wherein the 2D displacement is used as an input for at least one subsequent perception task including identifying objects in the unrectified images.

2. The method according to claim 1, wherein the 2D displacement comprises a disparity vector.

3. The method according to claim 1, wherein directions of the 2D-displacements are accumulated over time providing a filtered angular direction for image pixel positions.

4. The method according to claim 1, further comprising computing fundamental-matrix parameters of a corresponding stereo camera system from the pixel-by-pixel level disparity information.

5. The method according to claim 1, further comprising using the 2D displacement for a disparity correction for extrinsic camera-parameters of a stereo camera which captured the unrectified stereo camera images.

6. The method according to claim 1, further comprising calculating 3D real world coordinates in meters based on intrinsic camera parameters.

7. The method according to claim 1, further comprising calculating a dense 3D point cloud using the 2D displacement.

8. The method according to claim 7, further comprising performing rectification of the 2D-displacement, wherein the dense 3D point cloud is calculated from the rectified 2D displacement.

9. The method according to claim 1, further comprising using the 2D displacement in at least one of object tracking, 3D scene reconstruction, 3D mapping, 3D environment model generation, lost cargo detection, 3D road surface modelling or augmented reality (AR)-based visualization as part of a vehicle automated driving or advanced driver assistance system.

10. A system for extracting disparity information out of a pair of stereo camera images, comprising:

an input interface, a processor, and an output interface, wherein the input interface has an input coupled to an output of a camera and is configured to receive a pair of unrectified stereo camera images, the processor is configured to perform a 2D-matching of the received pair of unrectified images using a trained convolutional neural network of the processor providing 2D displacement on a pixel-by-pixel level as disparity information, and the output interface has an input coupled to an output of the processor, and is configured to output the 2D-displacement on pixel level, wherein the 2D matching is performed and the 2D displacement is provided by the processor absent pixel depth information of the unrectified images, and wherein the 2D displacement is used as an input for at least one subsequent perception task including at least object detection in the unrectified images.

11. A vehicle comprising the system for extracting disparity information according to claim 10 and a stereo camera system, wherein the stereo camera system is configured to generate the pairs of the unrectified stereo camera images and to output the generated pairs to the system for extracting disparity information.

12. The system according to claim 10, wherein the processor is further configured to perform rectification on the 2D-displacement.

13. The system according to claim 10, wherein the system, further comprising a second processor, the second processor performing an automated driving or advanced driver assistance function comprising at least one of lane detection, lane keeping assistance, traffic sign detection, speed limit assistance, road user detection, collision warning, emergency braking assistance, distance following control, construction site assistance, a highway pilot, a cruising chauffeur function, or an autopilot function.

* * * * *